Figure 1:
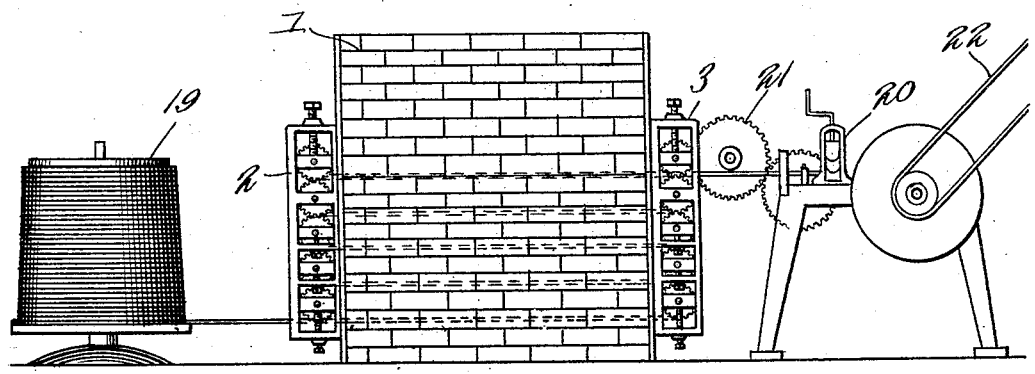

G. M. HESKAMP.
APPARATUS FOR TREATMENT OF METALLIC MATERIAL.
APPLICATION FILED MAR. 10, 1909.

931,599.

Patented Aug. 17, 1909.
2 SHEETS—SHEET 1.

Witnesses
Frank B. Hoffman
C. M. Catlin

Inventor
George M. Heskamp
By
Attorneys

G. M. HESKAMP.
APPARATUS FOR TREATMENT OF METALLIC MATERIAL.
APPLICATION FILED MAR. 10, 1909.
931,599.
Patented Aug. 17, 1909.
2 SHEETS—SHEET 2.
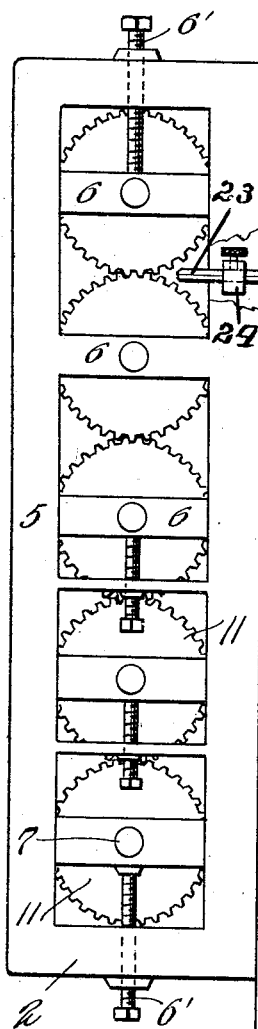
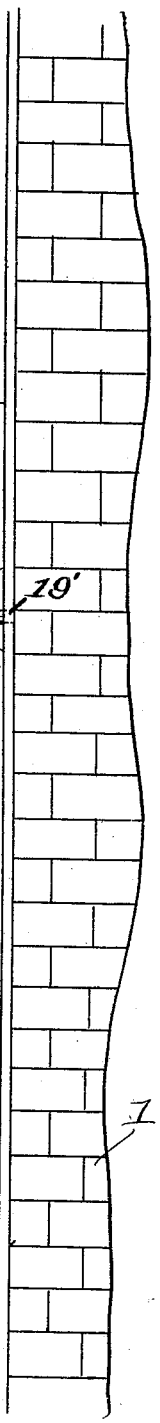
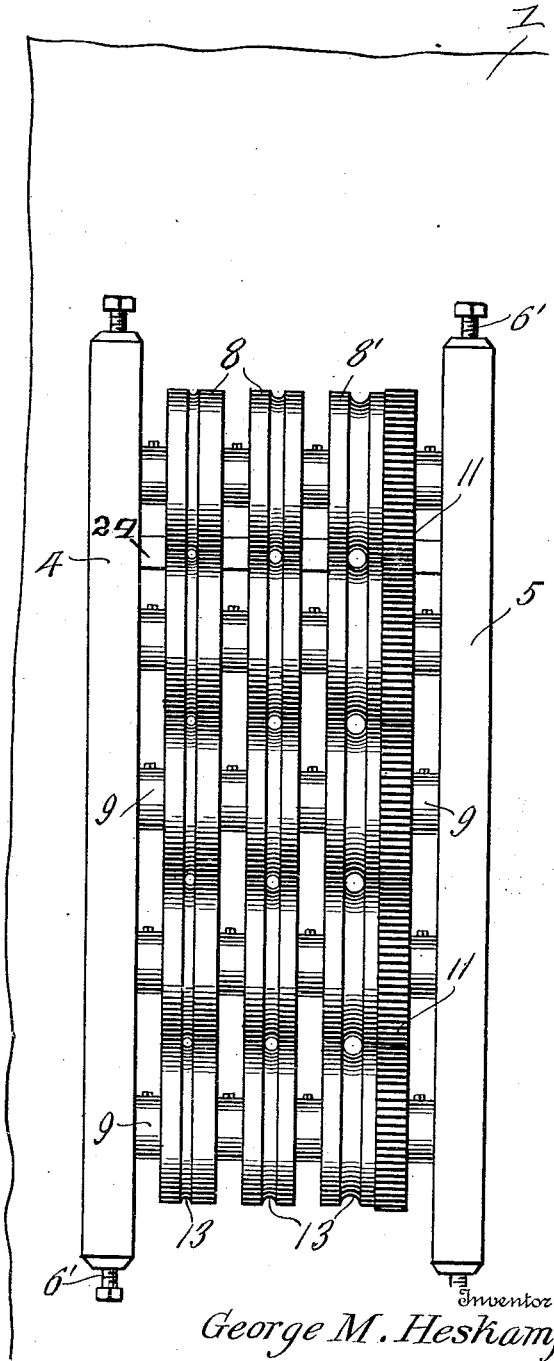

UNITED STATES PATENT OFFICE.

GEORGE M. HESKAMP, OF KOKOMO, INDIANA.

APPARATUS FOR TREATMENT OF METALLIC MATERIAL.

No. 931,599.　　　Specification of Letters Patent.　　Patented Aug. 17, 1909.

Application filed March 10, 1909. Serial No. 482,608.

*To all whom it may concern:*

Be it known that I, GEORGE M. HESKAMP, a citizen of the United States, residing at Kokomo, in the county of Howard and State of Indiana, have invented certain new and useful Improvements in Apparatus for Treatment of Metallic Material, of which the following is a specification.

The invention relates in general to an apparatus adapted for treatment of iron and steel wire or rods designed to be manufactured into a commercial product, and specifically to a continuous feed furnace in the operation of which said wire is annealed and adapted primarily for manufacture of fence staples, though the furnace is equally well adapted for treatment of material designed to be made into bolts, rivets, and other like articles requiring similar qualities in their manufacture.

As is well known in the art to which the invention relates, the wire or rods used in the manufacture of staples and the like, having been reduced in the wire-drawing room to the desired diameter, come from said room possessing too high a degree of hardness for the purposes desired and must be subjected to treatment embracing numerous processes before they are adapted to be fed to the staple or other machine to be manufactured into the product for the market. Present methods of treating the above-described material embrace usually the following steps: The wire or rods, reduced to the appropriate thickness, are placed in tubs or other vessels and subjected to the desired degree of heat in an annealing furnace which step is continued until the material is properly annealed and the undesired hardness eliminated. To facilitate handling, the material thus heated must be cooled which process leaves it coated with an undesirable scaly substance which must be removed, the latter being accomplished usually by treatment first with an acid and then with lime. The material is then subjected to a baking process in a drying furnace and when dry is adapted to be fed to the machine and manufactured into the desired product.

One object of the invention is the provision of an apparatus in the operation of which, in the treatment of material preparatory to manufacture of staples and the like, the numerous processes above-described as in general use intermediate of the withdrawal of the wire or rods from the wire-drawing room to the feeding of the treated material to the staple or other machine may be eliminated, and the wire or rods, if necessary, may be reduced to a desired diameter by the apparatus and fed directly to the staple, bolt, rivet, or other machine, such manipulation resulting, as obvious, in large labor and time saving and consequent reduction in cost of manufacture.

Another object of the invention is to produce an annealing furnace and coöperating feeding mechanism therefor of simple construction and few parts and in the use of which the material being operated upon may be quickly and effectively adapted for use and fed to the desired machine at varying appropriate temperatures.

With these and other objects in view the invention will now be described in the following specification and then more particularly pointed out in the claims, reference being had to the accompanying drawings, in which—

Figure 4:
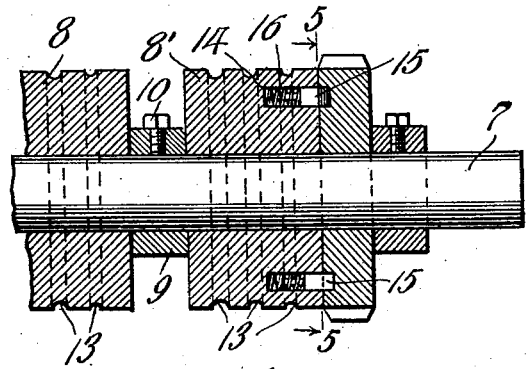
Figure 5:
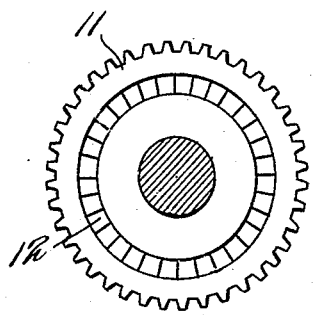
Figure 6:
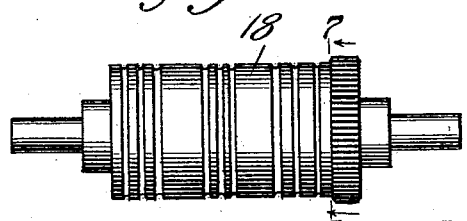
Figure 7:
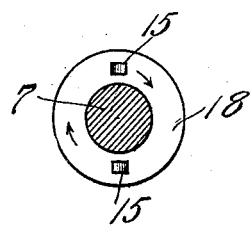
Figure 8:
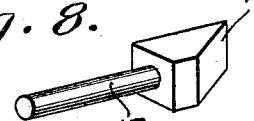

Figure 1 is a side elevation illustrating the invention in operative connection with a staple machine. Fig. 2 is an enlarged, broken side elevation illustrating part of the feed mechanism. Fig. 3 is a front elevation of part of the feed mechanism. Fig. 4 is a longitudinal section, partly in elevation, illustrating the preferred form of roller-member and connected parts. Fig. 5 is a side elevation of a roller-member gear wheel. Fig. 6 is a front elevation of a modified form of roller-member. Fig. 7 is a section on line 7—7 of Fig. 6. Fig. 8 is a perspective of one of the locking dogs of the roller-members.

Referring now to the drawings, wherein is illustrated the preferred embodiment of the details of my invention and wherein like reference numerals refer to like parts throughout the several views, 1 denotes an annealing furnace, formed approximately of rectangular outline and of suitable material, such as furnace brick or the like, to withstand a high degree of heat and adapted preferably for burning coke as fuel. Rigidly secured to opposite sides of the furnace at appropriate height are housings 2 and 3, a description of one of which will suffice for the other, they being similar in construction, function and relative position.

Referring to housing 2, it is formed of two similar bearing frames 4 and 5 extending laterally from the furnace sides in spaced parallel relation said frames embracing bearings 6, said bearings being adapted for adjustment through the medium of adjusting bolts 6' in any usual or desired manner. In the bearings 6 of the members 4 and 5 are hung the ends of a series of shafts 7 the function of the latter being to support in operative position a plurality of rod or wire guiding and reducing roller-members 8, the latter being loosely journaled on shafts 7 and adapted for revolution thereon in either direction. In the illustration a pair of these members 8 are shown but it is intended of course to employ as many as will best meet the needs of the particular material being operated upon.

8' denotes the roller-member positioned at the end of each series of roller-members on a particular shaft and is designed to act as the main roller-member, the rod or wire entering and leaving the furnace by means of one or the other of these members 8' and the constructions of the latter being modified to accomplish this purpose. These roller-members are held in properly-spaced relative position on their shaft by means of collars 9 loosely journaled and adapted for free lateral movement on shaft 7 but adapted for rigid engagement with said shafts when desired through the medium of set-screws 10, thus providing a means whereby undesired lateral play of the roller-members is prevented.

11 denotes a gear wheel, provided on its inner face with an annular series of spur teeth 12, and adapted, through a device to be later described, to be detachably connected to roller-member 8' and impart motion thereto in drawing the rod or wire into the furnace, through connection with motive power, which may be of any form desired, but preferably, as illustrated, through connection to a train of gears connected to and operated by the power operating the staple or other machine.

Each of the roller-members is provided with one or more peripheral grooves 13 which, in the instance where a plurality is employed are of varying size and are designed to reduce to the desired diameter the rod or wire being treated in its passage through the annealing furnace, while in the instance where but a single size of groove is used, they act as guides for said rod or wire which is initially of proper thickness. Each roller-member 8' is formed with a plurality of recesses 14 adapted to receive and house a locking-dog 15 designed, under tension of coil spring 16 circumferentially disposed around shaft 17 of said dog and within the recess, to be forced normally into operative engagement with spur teeth 12 of gear wheel 11, thus insuring operation of said roller-members 8' in drawing material into the furnace.

In Fig. 4 is illustrated the arrangement of peripheral grooves 13 when the rod or wire is to be reduced in diameter during operation of the annealing process, a series of different size grooves being disposed on a single roller-member and the members of the series of grooves being but slightly spaced one from another on the roller-member in order of decreasing or increasing size to provide for the rod or wire being reduced traveling, in its passage through the furnace, in practically a vertical plane.

In Fig. 6 is illustrated a modified form of roller-member in which said member extends as one piece throughout its entire length but, as in the other type described, is provided with locking-dog 15 and the desired form of peripheral grooves.

The operation is as follows: Assuming that fence staple material is to be treated and that the furnace fire has been regulated to the desired temperature, the wire or rods are brought directly from the producing mill to the annealing furnace and fed from a source of supply, as spool 19, and directed into the appropriate guiding or reducing groove in the roller-members, preferably a groove between the lowermost two of the series of members 8', the material being drawn into said groove and the furnace, through appropriately-positioned apertures 19' formed in the furnace walls, by means of the connection of said roller-members with the motive power desired, preferably, as shown, by means of gear train 21, operated by the power 22 operating the staple machine 20. The wire is then passed through the heated furnace and into the appropriate groove of the corresponding pair of roller-members on the opposite side of the furnace, around the upper member of said pair and into the desired groove of the next higher roller-member and across the furnace to the proper groove where the process just described is repeated and the material thus passed successively through the furnace until properly annealed and then fed directly to the staple machine at the temperature required.

From the foregoing it will be seen that I have provided a method of treating staple, rivet, bolt, and like material by which many of the processes now in general use in preparatory treatment of such material may be eliminated and an apparatus for carrying out the method which is simple in construction and well adapted to quickly and effectively accomplishing the purposes for which it is designed.

Having thus described my invention, what I claim as new and desire to secure by Letters Patent, is:

1. An annealing furnace comprising a fire-chamber, means to draw material therein and pass it successively through said chamber, means to reduce said material in diameter during said passage, and means to withdraw said material in a heated condition from said chamber.

2. An annealing furnace comprising a fire-chamber, a plurality of roller-members to draw material therein, means to reduce the diameter of said material, a plurality of roller-members to withdraw said material from said chamber, and means to operate said roller-members.

3. An annealing furnace comprising a fire-chamber, means to draw material therein and pass it successively therethrough, means to reduce the diameter of said material at successive stages during said passage, and means to withdraw said material from said chamber in a heated condition.

4. An annealing furnace comprising a fire-chamber, means to enter material therein and pass it successively therethrough, means operable in the movement of said entering means to reduce said material in diameter during said passage, and means to withdraw the material in a heated condition from the fire-chamber.

5. An annealing furnace comprising a fire-chamber, means to enter material therein and pass it successively through said chamber, means carried by the entering means to reduce said material in diameter during said passage, and means to withdraw said material in a heated condition from said chamber.

6. An annealing furnace comprising a fire-chamber, a plurality of roller-members to enter material therein, a plurality of roller-members to withdraw said material from the fire-chamber, and means, carried by and operable in the movement of the roller-members to reduce said material in diameter in its passage through the furnace.

7. In combination with a staple machine or the like, a source of supply of staple material, an annealing furnace comprising a fire-chamber, means to draw material from said source of supply and enter it in said fire-chamber and pass it successively therethrough, means to reduce said material in diameter during said passage, and means to withdraw said material from said chamber and direct it in a heated condition to said machine.

8. In combination with a staple machine or the like, a source of supply of staple material, an annealing furnace comprising a fire-chamber, a plurality of roller-members to draw material from said source of supply and enter it in said fire-chamber and pass it successively therethrough, grooves formed on the roller members to reduce said material in diameter during said passage, and a plurality of roller-members to withdraw the material from said chamber in a heated condition and direct it to said machine.

9. In combination with a staple machine or the like, an annealing furnace, means to pass staple material successively through the furnace for heating, and means to withdraw said material from the furnace while heated and direct it to the staple machine.

10. In combination with a staple machine or the like, an annealing furnace, means to pass material successively through the furnace for heating, means to reduce said material in diameter during said passage, and means to withdraw said material from the furnace while heated and direct it to the staple machine.

In testimony whereof, I will affix my signature in presence of two witnesses.

GEORGE M. HESKAMP.

Witnesses:
S. C. MILLS,
CHAS. L. HAMMOND.